July 13, 1937.   C. F. SIMPSON   2,086,825
APPARATUS FOR RECOVERY OF IODINE
Filed July 26, 1935   2 Sheets-Sheet 1
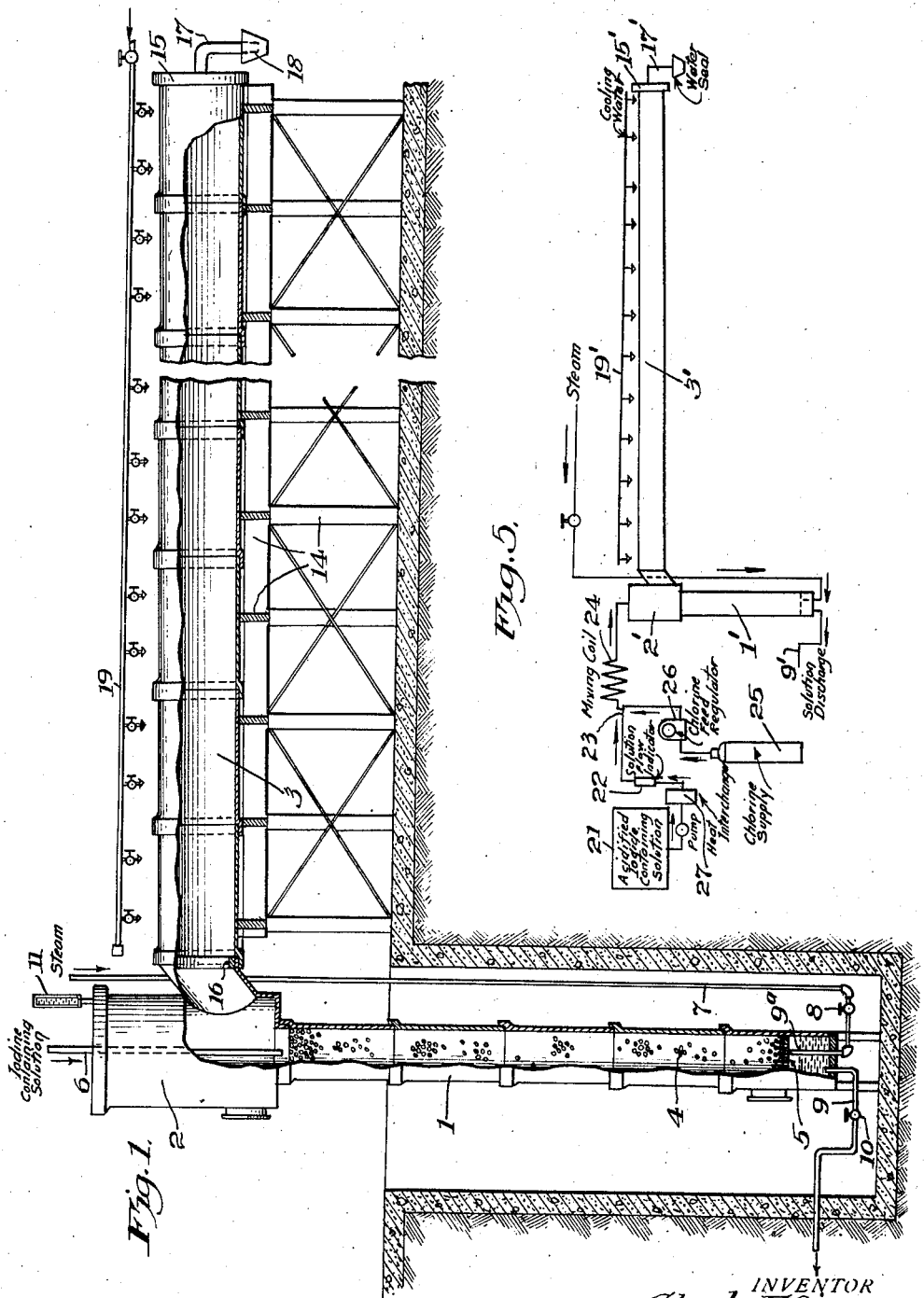

July 13, 1937.  C. F. SIMPSON  2,086,825
APPARATUS FOR RECOVERY OF IODINE
Filed July 26, 1935 2 Sheets-Sheet 2
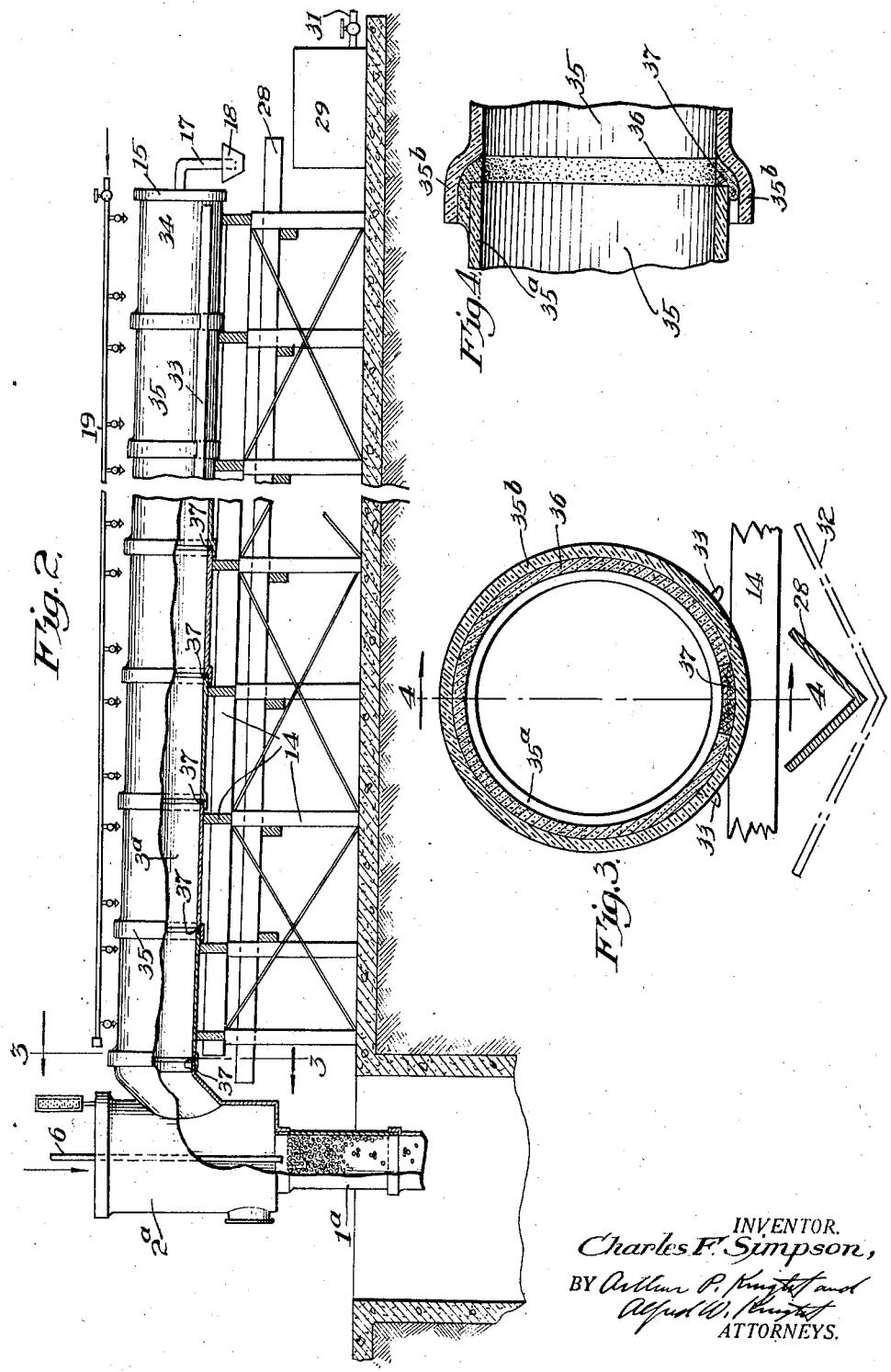

Patented July 13, 1937

2,086,825

UNITED STATES PATENT OFFICE 2,086,825

APPARATUS FOR RECOVERY OF IODINE

Charles F. Simpson, Alhambra, Calif., assignor to General Salt Company, Ltd., Los Angeles, Calif., a corporation of California Application July 26, 1935, Serial No. 33,212

8 Claims. (Cl. 23—264)

This invention relates to an apparatus for the recovery of iodine from aqueous or other liquids containing iodine either in elemental or chemically combined form.

This application is a continuation-in-part of my co-pending application for "Method for recovering iodine from solutions containing the same", filed February 4, 1933, Ser. No. 655,210, and pertains to an apparatus in which the method therein disclosed and claimed may be practiced.

The apparatus is particularly applicable to the recovery of iodine, by distillation, from oil well brines, but may also be used for the treatment of other iodine-containing liquids, such as natural brines containing iodine, liquors occurring in various plant procedures for recovery or extraction of iodine, or solutions of iodine in an oil absorption medium.

The principal object of this invention is to provide an apparatus for the efficient and economical recovery of iodine from liquids containing the same, such iodine being recovered as a solid and in a state of high purity.

A further object of this invention is to provide an apparatus for the recovery of iodine from a relatively large quantity of iodine-containing liquid in a given time.

A further object of this invention is to provide an apparatus for the removal of a relatively large proportion of the iodine from an iodine-containing liquid, affording substantially complete recovery of the iodine so removed, in a substantially pure state.

A further object of the invention is to provide an apparatus for the recovery of iodine which may be advantageously applied to the treatment of liquids containing iodine in either elemental or chemically combined form.

A further object of the invention is to provide an apparatus which may be used advantageously for the recovery of iodine from either concentrated or dilute solutions of iodine or compounds thereof.

A further object of this invention is to provide an apparatus of relatively low cost which will recover iodine from a relatively large quantity of liquid in a given time, with relatively low operating costs.

The apparatus of the present invention comprises a vertically elongated evaporating chamber, whose interior is provided, throughout at least a portion of its height, with suitable packing means or other means for promoting contact between gas and liquid, and a substantially unobstructed condensing chamber communicating with the upper portion of said evaporating chamber and preferably projecting laterally therefrom. Means are provided for introducing an iodine-containing liquid into the upper portion of the evaporating chamber and for removing residual liquid from the lower portion thereof. Means are also provided for introducing a hot condensable gaseous medium into the lower portion of the evaporating chamber. The condensing chamber is provided with cooling means for maintaining the same at a lower temperature than that existing in the evaporating chamber and sufficiently low to cause condensation of the gaseous medium and iodine vapor entering said condensing chamber, and means are also preferably provided for returning condensed gaseous medium from the condensing chamber to the evaporating chamber. For this purpose, the condensing chamber may open directly into the upper portion of the evaporating chamber and may be provided with a slight downward inclination toward the evaporating chamber so as to cause the condensed gaseous medium to flow by gravity into the evaporating chamber.

For treatment of liquids containing iodine in chemically combined form, the apparatus may also include means for introducing into the liquid going to the evaporating chamber a suitable treating agent for converting the iodine to elemental form, and means are also preferably provided for effecting thorough distribution of such agent in said liquid before entering the evaporating chamber.

The apparatus may also include heat-interchanging means in which the heat of the residual liquid removed from the evaporating chamber may be transferred to the incoming iodine-containing solution being introduced in the upper portion of the evaporating chamber.

The accompanying drawings illustrate apparatus in accordance with this invention and referring thereto:

Fig. 1 is a partly sectional side elevation of one form of evaporating and condensing means;

Fig. 2 is a partly sectional side elevation of an alternative construction of the evaporating and condensing means;

Fig. 3 is a section on line 3—3 in Fig. 2;

Fig. 4 is a section on line 4—4 in Fig. 3; and

Fig. 5 is a diagrammatic side elevation of a complete apparatus adapted for the recovery of iodine from a liquid containing chemically combined iodine.

The apparatus shown in Fig. 1 comprises a vertically elongated evaporating chamber 1 provided at its upper end with an enlarged header portion 2, and a substantially unobstructed condensing chamber 3 communicating with said header portion and projecting laterally therefrom. The above-mentioned parts may be formed of any suitable material, for example, of vitrified tile.

The interior of the evaporating chamber is filled throughout the greater portion of its height with suitable packing material 4, which may consist for example of silica pebbles, spiral tile packing members, "raschig" rings, or any other suitable material adapted to provide a large surface over which liquid may be distributed in passing downwardly through the chamber, so as to promote contact of said liquid by the gaseous medium passing upwardly through the chamber. I prefer to employ a packing material consisting of rounded pebble-like elements of a material having a high heat capacity. Such elements do not offer flat surfaces which afford opportunity for solid particles of iodine to lodge and build deposits of such magnitude as to partially "plug" the tower and prevent proper stripping of the iodine solution, a feature of considerable importance when a suspension of iodine is undergoing treatment. Said packing material may entirely fill the chamber 1, or may if desired, be supported a short distance from the bottom of said chamber in any suitable manner as, for example, by means of a perforated plate 5 adjacent the lower end of the chamber, and the body of packing material is shown as extending upwardly to adjacent the bottom of the enlarged header portion 2.

An iodine-containing liquid to be treated may be introduced into the upper portion of the chamber 1 through a supply pipe 6 opening into the header portion 2. This pipe 6 preferably extends downwardly to a point adjacent the level of the packing material 4, or, may be extended downwardly into the packing material a short distance, if desired. A hot condensable gaseous medium, such as steam, may be introduced into the lower portion of the evaporating chamber through pipe 7 provided with valve 8, said pipe being shown as opening into the bottom of the chamber below the perforated supporting plate 5. A drain pipe 9 is also connected to the bottom of the chamber for removal of residual solution, and said drain pipe may also be provided with a valve 10. I prefer to arrange the drain pipe 9 in such manner that a liquid trap may be maintained at the bottom of the chamber 1, to prevent the gaseous medium from by-passing directly from the pipe 7 to the pipe 9, a suitable liquid level being indicated at 9a. The evaporating chamber may also be provided with a thermometer 11 for indicating the temperature at any suitable position therein.

The condensing chamber 3 is shown as mounted on a suitable supporting structure 14, and is provided with a slight downward inclination toward the evaporating chamber, so as to provide for the return flow of condensed liquid to said evaporating chamber. The end of the condensing chamber removed from the evaporating chamber is closed by removable closure means such as a suitable cover 15. Said cover may also be provided with a vent pipe 17 whose lower end is immersed in a water sealed device 18 to a sufficient depth to maintain any desired, preferably slight, atmospheric pressure within the apparatus, while permitting escape of gas therefrom in case the pressure should exceed this value. Means are provided, such as the removable cover 15, so that the deposited iodine may be removed from the chamber 3 as required.

Any suitable means may be provided for cooling the condensing chamber. For example, such means may comprise water spray means 19 through which cooling water may be supplied to the exterior of said condensing chamber.

The apparatus above described may be used in the following manner for the recovery of iodine from a liquid containing elemental iodine. The solution, which may be an aqueous solution of iodine for example, is introduced through pipe 6, such solution being preheated if desired before such introduction. The solution then passes downwardly through the evaporating chamber and over the surfaces of the packing material therein, while a hot condensable gaseous medium, such as steam at suitable temperature, is introduced into the lower end of the evaporating chamber and passes upwardly through the column of packing material in contact with the downwardly passing liquid. The hot gaseous medium serves to heat the solution to a sufficient temperature to cause evaporation of iodine therefrom, it being understood that such evaporation will occur when the vapor pressure of iodine, at the temperature of the solution, exceeds the partial pressure of iodine in the gaseous or vapor phase in contact with the solution. In order that this evaporation may take place at a temperature below the sublimation temperature of iodine, and also at a temperature below the boiling point of the liquid in which the iodine is dissolved, I prefer to introduce the steam at a rate sufficient to not only heat the iodine-containing liquid to the required temperature but to also provide an excess of uncondensed steam so as to decrease the partial pressure of iodine in the vapor phase. The excess steam also provides a current of gas to assist in carrying the iodine vapors upwardly and removing the same from contact with the iodine-containing liquid.

The current of gaseous medium and iodine vapor passes upwardly into the header portion 2 and thence into the condensing chamber 3, which is maintained by cooling means 19 at a sufficiently low temperature to cause condensation of the iodine to solid form and condensation of the gaseous medium to liquid form. The condensed iodine collects as a solid upon the interior surface of the condensing chamber, while the condensed liquid flows by gravity back into the evaporating chamber.

The condensed iodine deposited on the walls of the condensing chamber will for the most part adhere to such walls and will not be mechanically washed away by the condensed gaseous medium and returned to the evaporating chamber. In some cases, however, it has been found that when an excessive amount of iodine is allowed to accumulate on the condenser walls, fragments will break away from the upper surfaces of such walls and fall to the bottom of the condenser and such fragments or loosened portions of such fragments may be mechanically washed toward the evaporating chamber by the condensed gaseous medium. For this reason I prefer to provide a barrier extending upwardly a short distance above the bottom wall of the condensing chamber and disposed adjacent the end of the condensing chamber nearest the evaporating chamber which will prevent such particles from entering said evaporating chamber but which does not interfere with the flow of vapors into the condensing chamber or the normal draining of the condensed gaseous medium into said evaporating chamber. Such a barrier, shown at 16, may comprise any suitable permeable means such as, for example, a perforated plate, a layer of burlap, or the like, adapted to serve as a filter means and permit condensed liquid to pass through and/or over said barrier and return to the evaporating chamber while preventing condensed iodine from returning to the evaporating chamber.

It will be understood that the condensed gaseous medium returned to the evaporating chamber may be substantially saturated with elemental iodine in solution, and, in order to minimize the amount of such returned iodine which must necessarily be re-vaporized, I prefer to so control the quantity of excess gaseous medium that substantially only the quantity necessary for the vaporization purposes above mentioned will be carried over into the condensing chamber. The return of condensed gaseous medium, in the case of use of steam for this medium, will necessarily add to the total quantity of liquid to be removed from the evaporating chamber, and, as this liquid will ordinarily contain a slight amount of unrecovered iodine in view of the fact that the process cannot be commercially and economically carried out in such manner as to get 100% recovery, and for this further reason, the amount of such condensed gaseous medium returned to the liquid is kept as low as is practical. Condensation of a portion of the gaseous medium may occur within the evaporating chamber, which will also add to the quantity of liquid to be removed from the process, and in order to minimize the amount of gaseous medium so condensed in heating the liquid to the required temperature, the above suggested expedient of pre-heating such liquid may be employed.

The remaining solution, from which the iodine has been substantially removed, and including liquid resulting from condensation of the steam or other gaseous medium, passes out thru drain pipe 9 and may be delivered to any suitable point for disposal or further treatment.

Referring to Figs. 2, 3, and 4, I have illustrated a form of apparatus comparable to that shown in Fig. 1, comprising a header 2a comparable to the header 2, a steaming column 1a comparable to the column 1 and a condensing chamber 3a comparable to the chamber 3. In this form of apparatus the chamber 3a inclines laterally downwardly from the header 2a rather than toward the header 2 as shown in Fig. 1 whereby an alternative disposal of the liquid condensed in the chamber may be obtained. This form of apparatus provides for removal of the condensed gaseous medium thru suitable openings provided in the lower wall of said chamber, said openings being of such character as to permit free outflow of liquid while retaining any solid condensed iodine within the condensing chamber. Referring particularly to Figs. 3 and 4, these openings may advantageously be provided at the lower portion of the joints between adjacent portions 35a and 35b of all or any desired number of adjoining pairs of tiles 35 which form the condensing chamber, as by cementing the major portion of the joint at 36 and providing a filter member or porous barrier at the bottom of the joint as at 37. This filter member or porous barrier may comprise a loose packing of oakum or other suitable fibrous material, though other filter means such as a porous block or the like may be cemented in place at this location. Suitable means are preferably provided for collection of liquid removed from the chamber 3a at the points 37, such as a trough 28 disposed longitudinally below the chamber 3a in position to receive such removed liquid. This trough 28 may convey the removed liquid to any desired point, as to a container 29 whence it may be withdrawn continuously or from time to time, as desired, thru a suitable valved outlet 31.

In view of the fact that it is desirable to provide a suitable cooling means for the condenser, such as a water spray means 19, I preferably provide suitable splash guards or the like 33 cemented or otherwise secured to the tiles to deflect any water resulting from the spray means 19 and direct the same to a suitable trough or the like shown in dot-dash lines at 32, in Fig. 3.

The chamber 3a is preferably provided with a removable cover or door 15, as above described in connection with the chamber 3, and a suitable filter section or porous barrier is preferably provided adjacent the lower end of the chamber 3a to prevent undue accumulation of condensed liquid adjacent the door, which accumulation would be awkward to handle when the door 15 is removed for the purpose of emptying the chamber of accumulated condensed iodine. The construction of this filter means may be entirely comparable to the construction above described at 37, as will be apparent to one skilled in the art. Alternatively, the end tile 34 may be disposed at such angle with respect to the remaining tiles 35 that the lowermost point of the condenser is located at the juncture of this end tile with the main body of the chamber, whereby the filter member 37 at such juncture will serve to prevent the above-mentioned accumulation of condensed liquid.

In the use of the above described apparatus, the gaseous medium condensed in the chamber 3a is not returned directly to the evaporating chamber, a feature which is advantageous when treatment of iodine-containing solutions of very low iodine content is being conducted, as the iodine content of such condensed gaseous medium might under such circumstances actually be higher than the iodine content of the liquid undergoing treatment. It will be understood that the condensed liquid recovered at 29 may be stored pending re-run thereof in the tower 1a or may be conveyed to an associated evaporating chamber, according to the particular requirements of a specific procedure.

It will be comprehended that the above described apparatus of the present invention is not limited to treatment of aqueous iodine-containing solutions, inasmuch as oil solutions of iodine such as, for example, iodine-containing petroleum oil, may advantageously be exposed to the evaporating action of any suitable gaseous treating medium. Furthermore, it is not essential that the gaseous treating medium be soluble or miscible in the solution from which the iodine is to be removed, for example, an oil solution of iodine may be exposed to the evaporating action of steam as above described in connection with aqueous iodine-containing solutions, or a hydrocarbon gas such as vaporized naphtha or the like may be passed in contact with the iodine-containing oil in such manner as to cause removal of the iodine in vapor form, the vaporized iodine and the excess gaseous medium being condensed in the condensing chamber as above described.

As above described the apparatus of the present invention may be employed in recovering iodine from a liquid containing the same in combined form, such as an aqueous solution of an iodide, iodate, or mixtures thereof, in which an apparatus of the general type shown in Fig. 5 may be employed; in which, numeral 21 indicates a source of aqueous solution of iodine in combined form, which solution may be considered for the purpose of description as a solution of an iodide. For the conversion of an iodide I prefer to use an oxidizing reagent such as chlorine. The iodide-containing solution may be passed through a heat inter-changing means 27 which may be associated with the hot liquid discharge line 9'; through a flow indicator 22 and thence to the header 2' of an evaporating column or chamber 1'. The heating of the incoming iodide-containing liquid in the heat exchanger 27 may be accomplished by utilizing the heated liquid discharged from the evaporating column 1' through the drain pipe 9' as will be apparent to one skilled in the art. At a suitable point between the solution flow indicator 22 and the evaporating chamber the chemical reagent is introduced in the solution, as for example, at 23, intimately mixed therewith as by means of a mixing coil 24 and the solution subsequently passed into the evaporating chamber. The introduced reagent may be supplied to the solution from the supply tank 25 through a feed regulator 26. It will be understood that the acidified iodide-containing solution will be supplied at a definite rate as indicated at 22 and the reagent feed regulator will be so adjusted with respect to the concentration of the iodide in the solution and the rate of supply of such solution that the proper proportionate amount of such reagent is introduced to satisfactorily convert the combined iodine into elemental form, while preferably avoiding any appreciable excess of such reagent. If desired suitable means may be provided for controlling the reagent feed regulator 26 automatically in response to the solution flow indicator 22, such means being well known in the art. As above pointed out, I prefer to cause a substantially complete reaction of the reagent with the iodide-containing solution before introduction thereof to the evaporating chamber, but such reaction may be partially effected before such introduction and completed within said chamber, or said reaction may be caused to take place after the solution has entered said chamber.

In the event that the iodine compound present in the liquid is an iodate, it may be treated with $SO_2$ or other suitable reducing agent adapted to convert the iodate to elemental iodine. A mixture of an iodate and an iodide may be acidified, which will allow reaction therebetween according to the following reaction:

$$HIO_3 + 5HI = 3H_2O + 3I_2$$

It will be thus seen that a mixture of an iodide and an iodate in which more than 83% of the iodine is present as an iodide will react, when acidified, to reduce all of the iodate to iodine, leaving an excess of iodine in the form of an iodide, which may be oxidized in any suitable manner, as by means of chlorine; and a mixture in which less than 83% of the iodine is present as an iodide may react to leave an excess of iodate, which may be reduced to iodine by means of $SO_2$, as above described.

The heat inter-changing means embodied in Fig. 5 provides for additional economy of operation of the apparatus which is particularly important when the concentration of iodine-containing material in the incoming liquid is relatively low, which would require the passage of a relatively large amount of such liquid through the evaporating chamber in proportion to the amount of iodine recovered therefrom, in which case it is highly advantageous that the thermal energy required for suitably heating the incoming liquid be realized principally from the discharged liquid rather than from the hot gaseous medium introduced at the bottom of the evaporating chamber.

The apparatus shown in Fig. 5 is particularly adapted for the recovery of iodine from oil-well brines. In such brines, the iodine is usually present in combined form, particularly in the form of iodides, and, as the concentration of the iodine compounds in such brines is relatively low, a considerable quantity of such brine must necessarily be passed through the apparatus for the recovery of a unit of iodine. When the above-mentioned form of apparatus is used in the treatment of oil-well brines, such brine, after suitable filtration or clarification treatment, if such treatment is necessary to prevent clogging of the evaporating column, is passed through the heat inter-changer 27 and the mixing coil 24 to the column 1', a suitable chemical reagent being introduced as at 23 as above described whereby the iodine compound is converted into elemental iodine. The iodine is evaporated within the column 1' as above described, by means of steam or other suitable gaseous agent, and the treated brine is withdrawn from the bottom of the column through the line 9' and passed through the heat inter-changer to waste or further treatment.

It will be further comprehended that the apparatus of the present invention may be used to remove iodine from solutions in which the concentration of iodine compound in the solution supplied from 21 is such that, after conversion of the iodine to elemental form, a higher concentration of iodine will be present than can be taken into solution by the available liquid, and in such cases the liquid supplied to the evaporating chamber may comprise a solution of iodine carrying an appreciable amount of precipitated iodine in suspension. This precipitated iodine may be directly vaporized within the evaporating chamber or may be progressively taken into solution by the liquid as the dissolved iodine in such liquid is removed by vaporization. When such iodine suspensions are being heated, I preferably employ rounded pebble-like packing elements in the evaporating tower, as and for the purpose hereinabove set forth. The remainder of the iodine recovery process subsequent to the introduction of the solution to the evaporating chamber may be substantially as described in connection with the form of apparatus shown in Fig. 1.

The condenser 3' is shown as sloping downwardly toward the column 1', in the same manner as the condenser 3 in Fig. 1, so as to provide for return of condensed gaseous medium to said column, and said condenser 3' is shown as provided with a removable cover 15' and with a water-sealed vent pipe 17'. It will be understood that a condenser of the type shown at 3a in Fig. 2 may alternatively be used in the apparatus shown in Fig. 5, in order to provide for separate discharge and collection of the condensed gaseous medium from said condenser.

I claim:

1. An apparatus for the recovery of iodine from liquids containing the same which comprises: a vertically extending evaporating chamber; means for supplying liquid to the upper portion of said chamber; means for withdrawing liquid from the lower portion of said chamber; means for introducing a heated gaseous medium into said chamber at the lower portion thereof; a substantially unobstructed condensing chamber communicating with said first-named chamber and extending laterally outwardly from the upper portion of said first-named chamber and provided at its outer end with a removable closure means; and a porous barrier at the lower portion of said condensing chamber adapted to permit free flow of liquid therefrom while retaining solids within said chamber.

2. The invention set forth in claim 1, said condensing chamber being inclined from its point of communication with said evaporating chamber upwardly toward the outer end thereof in position to cause draining of liquid downwardly therefrom by gravity into the upper portion of said first-named chamber, and said porous barrier being disposed adjacent said first-named chamber.

3. The invention set forth in claim 1, said condensing chamber being inclined from its point of communication with said first-named chamber downwardly toward the outer end thereof, and said porous barrier being spaced from said point of communication and disposed across an opening in the lower wall of said condensing chamber, so as to provide for free outflow of liquid to the exterior of said chamber.

4. The invention set forth in claim 1, said condensing chamber being inclined from its point of communication with said first-named chamber downwardly toward the outer end thereof and said porous barrier comprising a plurality of filter elements disposed across a plurality of openings located at intervals along the lower wall of said condensing chamber and providing free outflow of liquid to the exterior of said chambers.

5. The invention set forth in claim 1, said condensing chamber being inclined from its point of communication with said first-named chamber downwardly toward the outer end thereof, and comprising a plurality of sectional tubular elements forming a continuous tube, and said porous barrier being disposed across an opening in the lower wall of said condensing chamber at at least one of the junctures of two adjacent sectional elements in position to permit free outflow of liquid to the exterior of said condensing chamber.

6. The invention set forth in claim 1, and also comprising means for introducing a treating agent to said liquid supply means; and mixing means in said liquid supply means between said treating agent introducing means and said first-named chamber.

7. An apparatus for the recovery of iodine from liquids containing elemental iodine in suspension, which comprises: a vertically extending evaporating chamber; means for supplying a liquid to the upper portion of said chamber; packing means in said chamber comprising a plurality of rounded pebble-like packing elements; means for withdrawing liquid from the lower portion of said chamber; means for introducing a heated gaseous medium into said chamber at the lower portion thereof; a substantially unobstructed condensing chamber communicating with said first-named chamber and extending laterally outwardly from the upper portion thereof and provided at its outer end with removable closure means; and a porous barrier at the lower portion of said condensing chamber for withdrawing liquid therefrom while retaining solids in said chamber.

8. An apparatus for the recovery of iodine from liquids containing the same which comprises: a vertically extending evaporating chamber; means for supplying liquid to the upper portion of said chamber; means for withdrawing liquid from the lower portion of said chamber; means for introducing a heated condensable gaseous medium into said chamber at the lower portion thereof; a substantially unobstructed condensing chamber communicating with said first-named chamber and extending laterally outwardly from the upper portion of said first-named chamber and inclined upwardly therefrom to permit draining of condensed liquid by gravity from said condensing chamber into said evaporating chamber; removable closure means at the outer end of said condensing chamber; and barrier means adjacent the point of communication of said evaporating chamber with said condensing chamber, and extending upwardly a short distance from the lower wall of said condensing chamber in position to prevent return of condensed solids from said condensing chamber into said evaporating chamber.

CHARLES F. SIMPSON.